United States Patent
Nam et al.

(10) Patent No.: US 9,272,678 B2
(45) Date of Patent: Mar. 1, 2016

(54) VEHICLE BODY REINFORCING STRUCTURE FOR COPING WITH SMALL OVERLAP COLLISION

(71) Applicant: Hyundai Motor Company, Seoul (KR)

(72) Inventors: Younchic Nam, Hwaseong-si (KR); Byoungchul Kim, Seoul (KR); Ki-su Lee, Busan (KR); Changho Shin, Anyang-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/548,891

(22) Filed: Nov. 20, 2014

(65) Prior Publication Data

US 2015/0336525 A1 Nov. 26, 2015

(30) Foreign Application Priority Data

May 23, 2014 (KR) .......................... 10-2014-0062550

(51) Int. Cl.
*B60R 19/34* (2006.01)
*B62D 25/08* (2006.01)

(52) U.S. Cl.
CPC .............. *B60R 19/34* (2013.01); *B62D 25/082* (2013.01)

(58) Field of Classification Search
CPC ........ B60R 19/24; B60R 19/26; B60R 19/34; B62D 25/082

USPC .............................. 296/187.09, 187.1, 193.09
See application file for complete search history.

(56) References Cited

U.S. PATENT DOCUMENTS

| 8,596,711 | B2 * | 12/2013 | Yasui et al. ............... 296/187.09 |
| 8,991,903 | B1 * | 3/2015 | Alavandi et al. ......... 296/187.09 |
| 2008/0023954 | A1 * | 1/2008 | Eichberger et al. ........... 280/784 |

FOREIGN PATENT DOCUMENTS

| JP | 2009-248603 A | 10/2009 |
| JP | 2012-228906 A | 11/2012 |
| JP | 2013-212757 A | 10/2013 |
| KR | 10-2014-0042969 A | 4/2014 |

* cited by examiner

*Primary Examiner* — Joseph D Pape
(74) *Attorney, Agent, or Firm* — Morgan, Lewis & Bockius LLP (57) ABSTRACT

A vehicle body reinforcing structure for coping with a small overlap collision may include front side members which may be extended in a longitudinal direction of a vehicle and disposed at left and right sides in a width direction of the vehicle, a crash box which is installed to a front end of the front side member in the longitudinal direction of the vehicle and absorbs and reduces impact when receiving the impact to be deformed, a bumper beam which is disposed in front of the crash box in the longitudinal direction of the vehicle, coupled to the crash box, and extended in the width direction of the vehicle, and a reinforcing member which is coupled to both the crash box and the front side member, and protrudes outside of the bumper beam in the width direction of the vehicle to transfer an impact energy to the front side member.

18 Claims, 6 Drawing Sheets

VEHICLE BODY REINFORCING STRUCTURE FOR COPING WITH SMALL OVERLAP COLLISION

CROSS-REFERENCE TO RELATED APPLICATION

The present application claims priority to and the benefit of Korean Patent Application No. 10-2014-0062550 filed on May 23, 2014, the entire contents of which is incorporated herein for all purposes by this reference.

BACKGROUND OF THE INVENTION

1. Field of the Invention

The present invention relates to a vehicle body reinforcing structure for coping with a small overlap collision, and more particularly, to a vehicle body reinforcing structure for coping with a small overlap collision which makes it possible to enhance small overlap collision response performance by increasing a collision area and width against a small overlap barrier when a front small overlap collision occurs.

2. Description of Related Art

In general, a front vehicle body of a vehicle is a frame structure which is positioned at a front side in the longitudinal direction of a vehicle while forming an engine compartment, and includes a front end module which forms a front side of the engine compartment and accommodates a cooling module, a head lamp, etc., a front fender apron member which forms the left and right sides of the engine compartment and accommodates a suspension system and has a space in which wheels are installed, and a dash panel which is positioned at the rear of the engine compartment and partitions a passenger compartment and the engine compartment.

Also, below the engine compartment, front side members extending in the longitudinal direction of the vehicle are disposed at left and right sides, respectively, to reinforce the structural strength of the front vehicle body, and a sub-frame is disposed below the front side member so as to install and support the engine and a transmission at the engine compartment as well as a suspension system, etc.

At the front end of the front side member, a bumper beam extending in a width direction of the vehicle is installed so as to enhance the front collision response performance of the vehicle. The bumper beam is connected to the front end in a longitudinal direction of the vehicle of the front side member via a crash box.

In the case where the vehicle equipped with the front vehicle body collides head-on with an object (hereinafter referred to as a "small overlap collision barrier") such as an obstacle or another vehicle in a small overlap way at an outer edge portion in the width direction of the vehicle while the vehicle is traveling, impact energy to the front side member is not effectively transferred because an overlap area or an overlap width between the front side member and the small overlap collision barrier is small.

Due to this, when the front side member does not perform an impact absorption function well, the absorption of impact energy and the transfer of the impact energy to another portion are not smoothly performed, such that excessive damage or breakdown may partially occur at the vehicle body, and the impact energy is excessively transferred to the passenger compartment, thereby threatening passenger's safety.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a vehicle body reinforcing structure for coping with a small overlap collision which makes it possible to enhance front small overlap collision response performance of a vehicle in such a way to increase a collision area and a collision width against a small overlap barrier in the case where the vehicle collides with a small overlap collision barrier at its outer edge portion in the width direction of the vehicle while efficiently transferring impact energy toward the front side member, so that the front side member is properly deformed, thus efficiently absorbing and alleviating such impact, whereby the impact is distributed to other portions.

In an aspect of the present invention, a vehicle body reinforcing structure for coping with a small overlap collision, may include front side members which are extended in a longitudinal direction of a vehicle and disposed at left and right sides in a width direction of the vehicle, a crash box which is installed to a front end of the front side member in the longitudinal direction of the vehicle and absorbs and reduces impact when receiving the impact to be deformed, a bumper beam which is disposed in front of the crash box in the longitudinal direction of the vehicle, coupled to the crash box, and extended in the width direction of the vehicle, and a reinforcing member which is coupled to both the crash box and the front side member, and protrudes outside of the bumper beam in the width direction of the vehicle to transfer an impact energy to the front side member.

The reinforcing member may include a front reinforcing member which is supported by the crash box, and a rear reinforcing member which is installed at the front side member and connected to the front reinforcing member.

The front reinforcing member is extended outwards in the width direction of the vehicle, and the rear reinforcing member is installed obliquely forward in the longitudinal direction of the vehicle.

The front reinforcing member and the rear reinforcing member are connected to each other at an acute angle.

The front reinforcing member and the rear reinforcing member each may have a pipe shape.

The front reinforcing member may include a front upper reinforcing member which is disposed at an upper side in a height direction of the vehicle, and a front lower reinforcing member which is disposed at a lower side to make a pair with the front upper reinforcing member, and the rear reinforcing member may include a rear upper reinforcing member which is disposed at an upper side in the height direction of the vehicle, and a rear lower reinforcing member which is disposed at a lower side to make a pair with the rear upper reinforcing member.

The front upper reinforcing member is installed to and supported by the crash box through the front mounting bracket, and the front lower reinforcing member is installed to and supported by the crash box through the front lower mounting bracket.

The front upper mounting bracket may include an upper surface which is in contact with an upper surface of the crash box in the height direction of the vehicle and fixedly welded along one edge thereof, and an outer side surface which is vertically bent from the upper surface and in contact with an outer side surface of the crash box in the width direction of the vehicle, wherein at the outer side surface, an assembling hole having a circular arc shape is formed, and an end of the front upper reinforcing member is inserted and supported in the assembling hole, and wherein the front lower mounting bracket may include a lower surface which is in contact with a lower surface of the crash box in the height direction of the vehicle and fixedly welded along an edge thereof, and an outer side surface which is vertically bent from the lower surface and is in contact with an outer side surface of the crash box in the width direction of the vehicle, wherein at the outer side surface, an assembling hole having a circular arc shape is formed, and an end of the front lower reinforcing member is inserted and supported in the assembling hole.

The rear upper reinforcing member and the rear lower reinforcing member are fixedly installed at the front side member through the rear mounting bracket.

The rear mounting bracket is formed in a quadrangular plate shape and fixedly welded at the outer side surface of the front side member in the width direction of the vehicle along the edge thereof, at the rear mounting bracket, two assembling bosses are formed to obliquely project forwards in the longitudinal direction of the vehicle, and at each of the two assembling bosses, an assembling hole is formed, and an end of each of the rear upper reinforcing member and the rear lower reinforcing member is fixedly inserted in each assembling hole.

An engaging flange is provided at each of the front upper reinforcing member and the front lower reinforcing member, and the rear upper reinforcing member and the rear lower reinforcing member, the front upper reinforcing member and the rear upper reinforcing member are engaged to each other by the engaging flange, and the front lower reinforcing member and the rear lower reinforcing member are engaged to each other by the engaging flange.

According to the exemplary embodiment of the present invention, the vehicle body reinforcing structure for coping with a small overlap collision according to an exemplary embodiment of the present invention is characterized in that a front reinforcing member protruding outward more than a bumper beam in the width direction of the vehicle is installed by a mounting bracket at a crash box, and at the front side member, a rear reinforcing member connected to the front reinforcing member is installed by a mounting bracket. When a small overlap collision barrier has a small overlap collision on its outer edge portion of the vehicle body in the width direction of the vehicle, the front reinforcing member may increase the collision area and the collision width against the small overlap collision barrier.

The impact energy received when the front reinforcing member directly collides with the small overlap collision barrier and the impact energy transferred through the bumper beam are transferred to the rear reinforcing member, and the rear reinforcing member effectively transfers the received impact energy to the front side member.

Therefore, when the front side member effectively receives impact energy from the small overlap collision barrier and is compressed and deformed, impact energy is absorbed. The front side member is bent toward the engine compartment when impact energy is transferred through the rear reinforcing member, and effectively transfers impact energy to the power train installed in proximity to the front side member while generating in a width direction behavior (the vehicle deviates from the small overlap barrier) of the vehicle, thus preventing excessive damage and breakdown of the vehicle body and decreasing the impact energy to the passenger compartment, which results in protecting the passenger.

Meanwhile, when the vehicle has a front collision with the front collision barrier having a relatively wider width and area, the crash box receives impact energy and is compressed backward, in the longitudinal direction of the vehicle, and is deformed, and the mounting bracket of the front reinforcing member integrally attached to the crash box also departs and deviates from a surface contact surface against the mounting bracket, and since the front reinforcing member does not receive any impact energy from the front collision barrier, no impact energy is transferred from the front reinforcing member to the rear reinforcing member, the front side member is not bent, but is compressed backward, based on its longitudinal direction, and is deformed, thereby effectively absorbing and decreasing impact energy.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, the exemplary embodiment of the present invention will be described with reference to the accompanying drawing.

Figure 1:
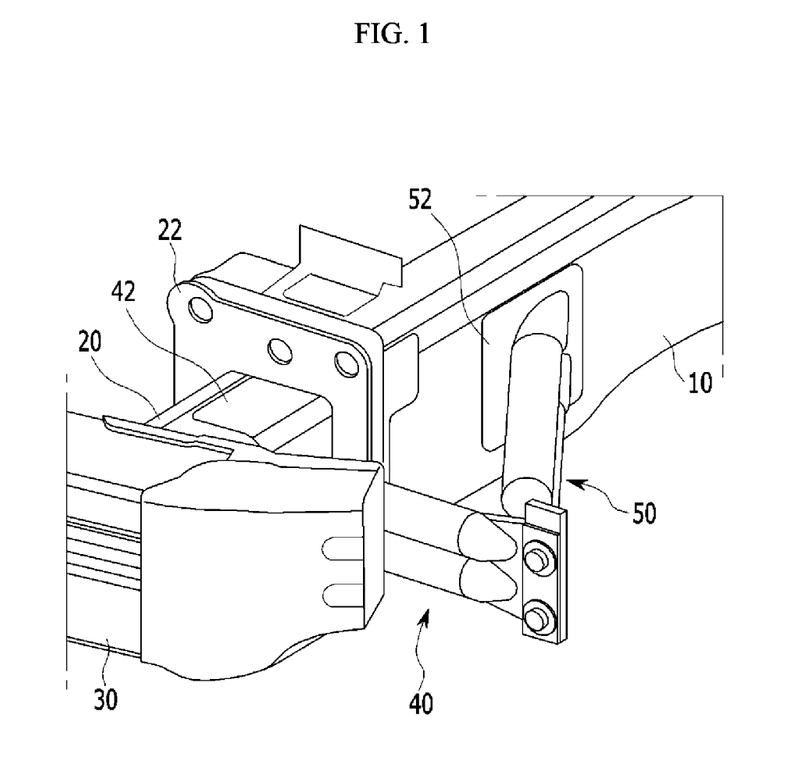
FIG. 1 is a perspective view illustrating a vehicle body reinforcing structure for coping with a small overlap collision according to an exemplary embodiment of the present invention.

Referring to FIG. 1, the vehicle body reinforcing structure for coping with a small overlap collision according to an exemplary embodiment of the present invention may include front side members 10 which are extended in a longitudinal direction of the vehicle and disposed at left and right sides in a width direction of the vehicle.

At the front end of the front side member 10 in the longitudinal direction of the vehicle, a crash box 20 which absorbs an impact while being compressively deformed by receiving an impact may be fixedly installed through a mounting plate 22.

The crash box 20 is generally formed in a quadrangular box shape, and at the front end of the crash box 20 in the longitudinal direction of the vehicle, a bumper beam 30 extended in the width direction of the vehicle may be fixedly installed.

At the crash box 20, an end of a front reinforcing member 40 according to an exemplary embodiment of the present invention may be installed and supported through a front mounting bracket 42.

At an outer surface of the front side member 10 in the width direction of the vehicle, an end of a rear reinforcing member 50 according to the exemplary embodiment of the present invention may be fixedly installed by a rear mounting bracket 52.

The front reinforcing member 40 is installed extending outwards in the width direction of the vehicle, and the rear reinforcing member 50 may be obliquely installed forwards in the longitudinal direction of the vehicle.

As a result, the other end of the front reinforcing member 40 and the other end of the rear reinforcing member 50 are coupled to each other while generally forming an acute angle therebetween.

Figure 2:
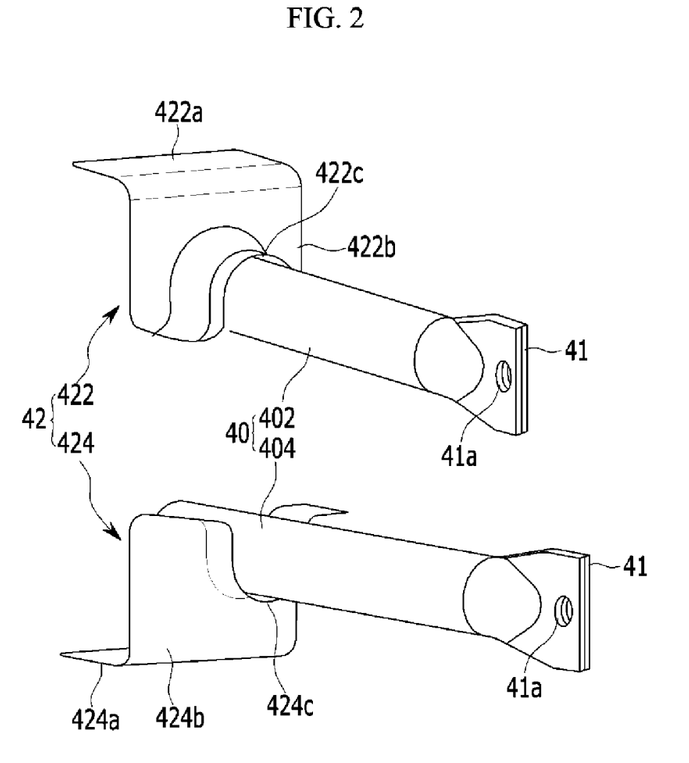
FIG. 2 is an exploded perspective view illustrating a front reinforcing member for coping with a small overlap collision according to an exemplary embodiment of the present invention.

Referring to FIG. 2, the front reinforcing member 40 may be generally formed in a pipe shape.

The front reinforcing member 40 includes a front upper reinforcing member 402 disposed at an upper side in a height direction of the vehicle, and a front lower reinforcing member 404 disposed at a lower side, which form a pair.

With the other end of each of the front upper reinforcing member 402 and the front lower reinforcing member 404, an engaging flange 41 is integrally formed, an assembling through-hole 41a is formed in the engaging flange 41, and the engaging flange 41 may be engaged to the rear reinforcing member 50 through an assembling bolt.

The front mounting bracket 42 may include a front upper mounting bracket 422 into which an end of the front upper reinforcing member 402 may be inserted and supported, and a front lower mounting bracket 424 into which an end of the front lower reinforcing member 404 may be inserted and supported.

The front upper mounting bracket 422 includes an upper surface 422a which is in contact with the upper surface of the crash box 20 in the height direction of the vehicle and is fixedly welded along the edge thereof, and an outer side surface 422b which is vertically bent from the upper surface 422a and is in contact with the outer side surface of the crash box 20 in the width direction of the vehicle to be generally formed in a "⊓" the height At the outer side surface 422b, an assembling hole 422c which is generally formed in an arc shape is formed, and an end of the front upper reinforcing member 402 may be inserted and supported in the assembling hole 422c.

The front lower mounting bracket 424 is generally formed in an "L" shape, by including a lower surface 424a which is in contact with the lower surface of the crash box 20 in the height direction of the vehicle and fixedly welded along the edge thereof, and an outer side surface 424b which is vertically bent from the lower surface 424a and is in contact with the outer side surface of the crash box 20 in the width direction of the vehicle.

An assembling hole 424c having a generally circular arc shape is formed at the outer side surface 424b, and an end of the front lower reinforcing member 404 may be inserted and supported in the assembling hole 424c.

Figure 3:
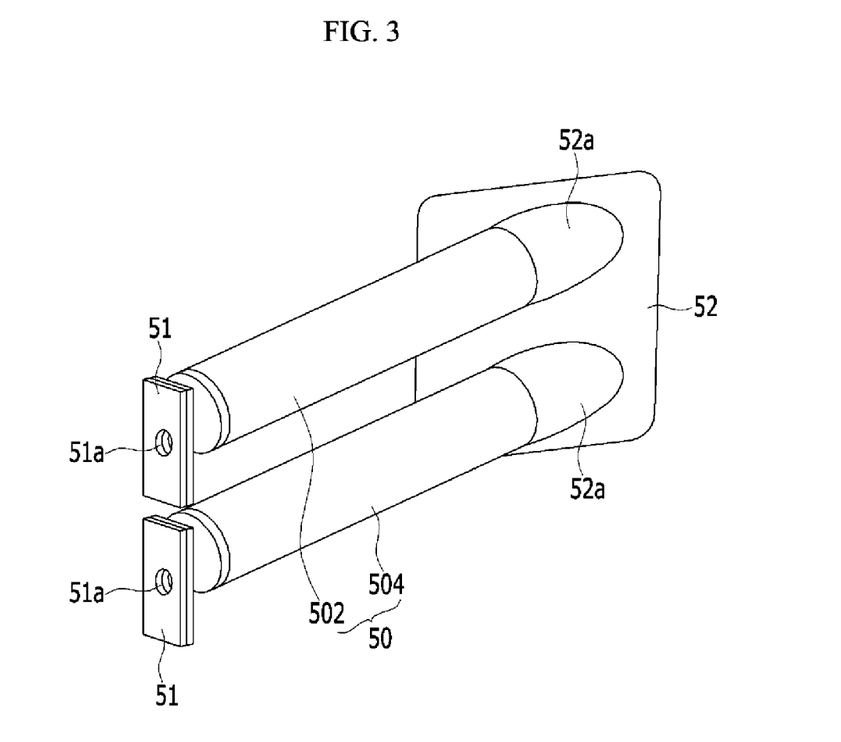
FIG. 3 is a perspective view illustrating a rear reinforcing member for coping with a small overlap collision according to an exemplary embodiment of the present invention.

Referring to FIG. 3, the rear reinforcing member 50 is formed generally in a pipe shape.

The rear reinforcing member 50 includes a rear upper reinforcing member 502 which is disposed at an upper side in the height direction of the vehicle, and a rear lower reinforcing member 504 which is disposed at a lower side, which form a pair.

At the other end of each of the rear upper reinforcing member 502 and the rear lower reinforcing member 504, an engaging flange 51 is integrally formed, an assembling through-hole 51a is formed in the engaging flange 51, and the engaging flange 51 is engaged to the engaging flange 41 of the front reinforcing member 40 through an assembling bolt.

The rear mounting bracket 52 may be formed generally in a quadrangular plate shape, and may be fixedly welded at an outer side surface of the front side member 10 in the width direction of the vehicle along the edge thereof.

At the rear mounting bracket 52, two assembling bosses 52a may be formed to obliquely project forwards in the longitudinal direction of the vehicle.

Assembling holes are formed at each of the two assembling bosses 52a, and one end of the rear upper reinforcing member 502 and one end of the rear lower reinforcing member 504 are inserted into each of the assembling holes, respectively, to be fixedly installed using, for example, a welding method or a bolting method.

Figure 4:
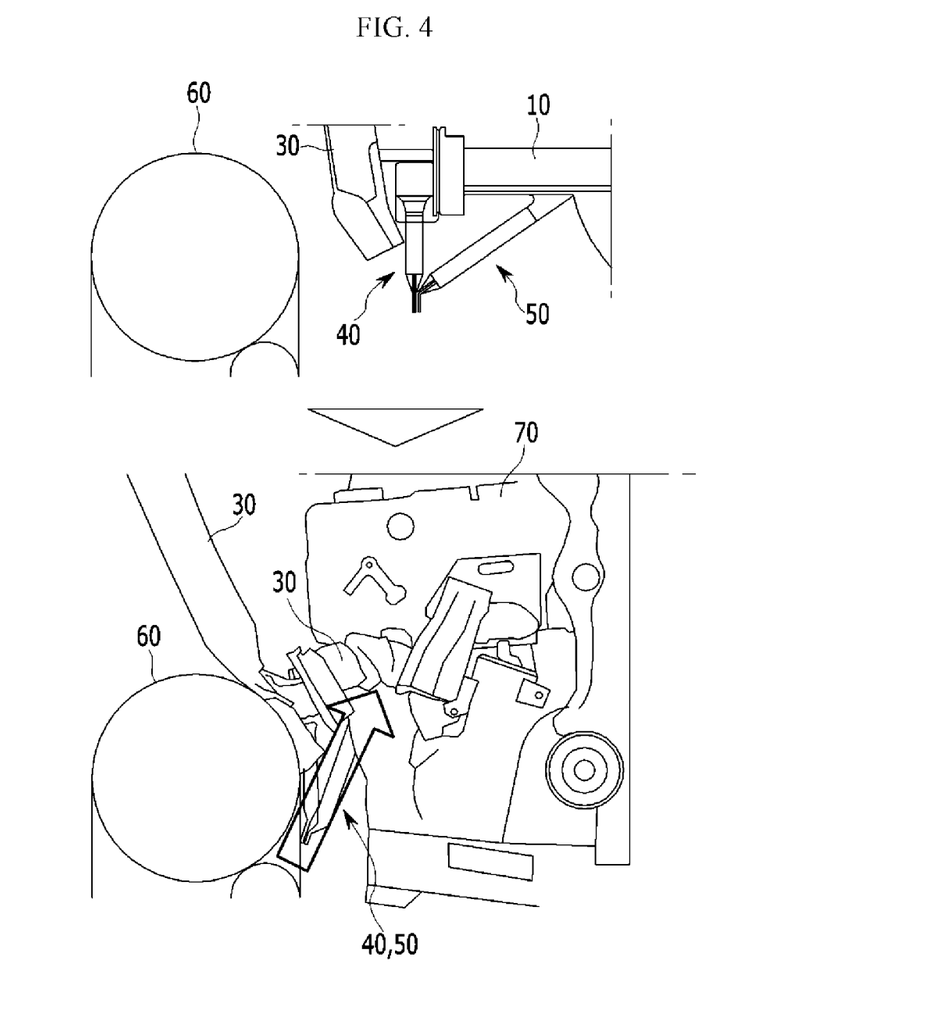
FIG. 4 is a modified diagram for describing a case where a vehicle body reinforcing structure for coping with a small overlap collision collides with a small overlap barrier according to an exemplary embodiment of the present invention.

Referring to FIG. 4, when the vehicle equipped with the vehicle body reinforcing structure for coping with a small overlap collision according to the exemplary embodiment of the present invention collides with a small overlap collision barrier 60 at the outside in the width direction of the vehicle, that is, when the front side member 10 and the small overlap collision barrier 60 collide with each other while not being overlapped with each other or being slightly overlapped with each other, the bumper beam 30 positioned at the front side in the longitudinal direction of the vehicle first collides with the small overlap collision barrier 60, and the bumper beam 30 is pushed backward in the longitudinal direction of the vehicle by means of the small overlap collision barrier 60 to transfer impact energy to the crash box and compress the crash box, and when the impact energy is transferred to the crash box, the crash box absorbs and reduces the impact energy through the compression stain and transfer the impact energy to the front side member 10.

The front side member 10 receives the impact energy to be deformed to absorb and decrease the impact energy. During the above-described collision, the front reinforcing member 40 and the rear reinforcing member 50 receive impact energy from the small overlap collision barrier 60 and transfer the impact energy to the front side member 10, and the impact energy transferred to the front side member 10 through the rear reinforcing member 50 is obliquely applied to the front side member 10 due to the installed angle of the rear reinforcing member 50 to push the front side member 10 toward the engine compartment.

When the front side member 10 is bent toward a power train 70 which is installed to be adjacent to the engine compartment and in contact with the power train 70, and the impact energy is properly distributed and absorbed to other components of the vehicle body from the front side member 10 through the power train 70, and the transfer of the impact energy toward the passenger compartment may be decreased, thereby safely protecting the passenger.

Figure 5:
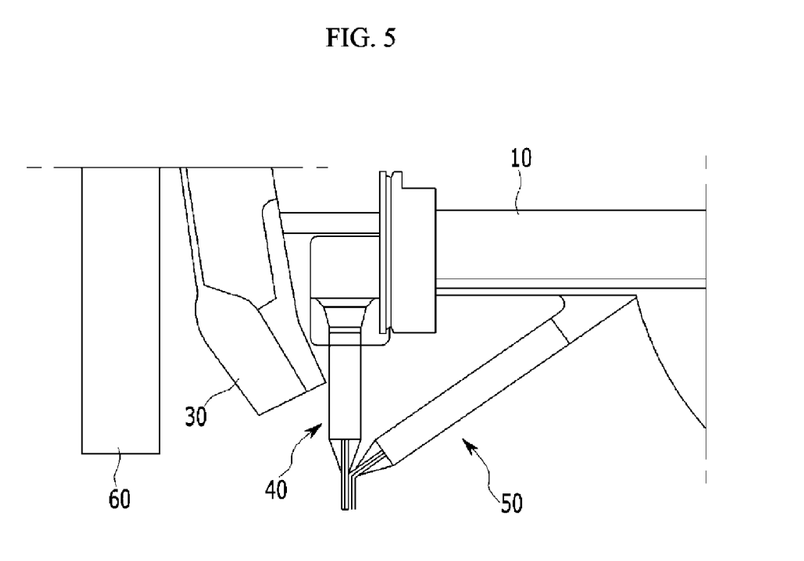
FIG. 5 is a diagram for describing a state just before a vehicle body reinforcing structure for coping with a small overlap collision collides with the front collision barrier according to an exemplary embodiment of the present invention.
Figure 6:
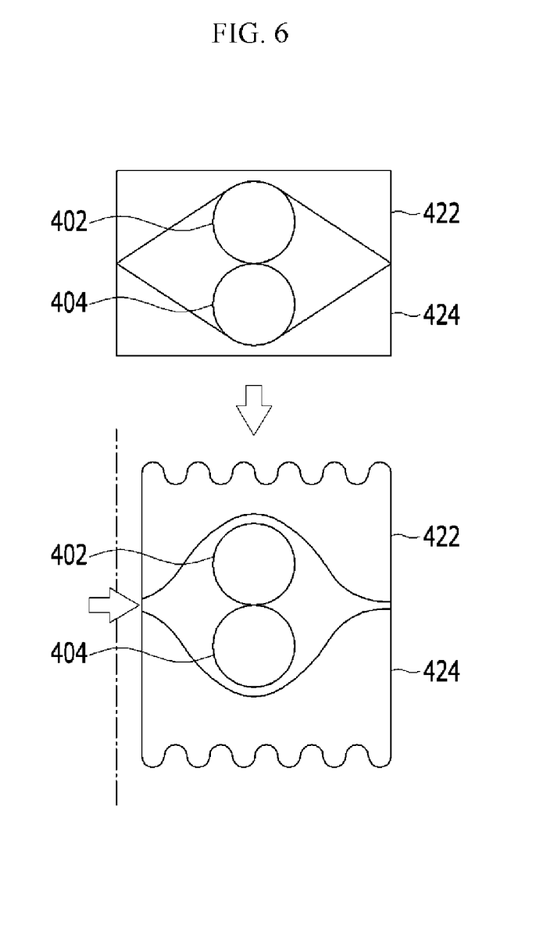
FIG. 6 is a modified diagram for describing states just before and after the vehicle body reinforcing structure for coping with a small overlap collision collides with the front collision barrier according to an exemplary embodiment of the present invention.

Referring to FIGS. 5 and 6, when the vehicle equipped with the vehicle body reinforcing structure for coping with a small overlap collision according to the exemplary embodiment of the present invention collides head-on with a head-on collision barrier 80 having a relatively wider area than the small overlap collision barrier 60, the impact energy is not transferred to the front side member 10 as much as possible through the front reinforcing member 40 and the rear reinforcing member 50, and instead it is compressed backward and deformed in its longitudinal direction, and as a result, the front side member 10 is not bent as much as possible but is compressively deformed downwards in the longitudinal direction to absorb the impact energy.

To this end, the front upper reinforcing member 402 and the front lower reinforcing member 404 are coupled to each other to be inserted and supported in the assembling grooves 422c and 424c of the mounting brackets 422 and 424 (A), and when the impact due to the collision is transferred to the crash box 20 and the crash box 20 is compressively deformed, the front upper mounting bracket 422 and the front lower mounting bracket 424 which are fixedly attached to the crash box 20, respectively, are also compressively deformed together with the crash box 20. During the above-described procedures, the assembling grooves 422c and 424c of the mounting brackets 422 and 424 are deformed so that widths of the assembling grooves 422c and 424c are widened (B), and the reinforcing members 402 and 404 inserted and supported in the assembling grooves 422c and 424c of the mounting brackets 422 and 424 are spaced apart from the assembling grooves 422c and 424c of the mounting brackets 422 and 424 to be separated from the mounting brackets 422 and 424.

Therefore, the impact energy is not transferred from the head-on collision barrier 80 to the front reinforcing member 40, and thus the impact energy is also not transferred to the rear reinforcing member 50 through the front reinforcing member 40. As a result, in the case of the front collision according to the exemplary embodiment of the present invention, the impact energy is not transferred through the reinforcing members 40 and 50 toward the side of the front side member 10, so the front side member 10 is only slightly bent to be compressively deformed only in the longitudinal direction, thereby effectively absorbing and decreasing the front collision impact energy.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A vehicle body reinforcing structure for coping with a small overlap collision, comprising:
    front side members which are extended in a longitudinal direction of a vehicle and disposed at left and right sides in a width direction of the vehicle;
    a crash box which is installed to a front end of the front side member in the longitudinal direction of the vehicle and absorbs and reduces impact when receiving the impact to be deformed;
    a bumper beam which is disposed in front of the crash box in the longitudinal direction of the vehicle, coupled to the crash box, and extended in the width direction of the vehicle; and
    a reinforcing member which is coupled to both the crash box and the front side member, and protrudes outside of the bumper beam in the width direction of the vehicle to transfer an impact energy to the front side member,
    wherein the reinforcing member includes:
        a front reinforcing member which is supported by the crash box; and
        a rear reinforcing member which is installed at the front side member and connected to the front reinforcing member, and
    wherein the front reinforcing member and the rear reinforcing member each have a pipe shape.

2. The structure of claim 1, wherein the front reinforcing member is extended outwards in the width direction of the vehicle, and the rear reinforcing member is installed obliquely forward in the longitudinal direction of the vehicle.

3. The structure of claim 1, wherein the front reinforcing member and the rear reinforcing member are connected to each other at an acute angle.

4. The structure of claim 1, wherein the front reinforcing member includes:
    a front upper reinforcing member which is disposed at an upper side in a height direction of the vehicle; and
    a front lower reinforcing member which is disposed at a lower side to make a pair with the front upper reinforcing member, and
    the rear reinforcing member includes:
        a rear upper reinforcing member which is disposed at an upper side in the height direction of the vehicle; and
        a rear lower reinforcing member which is disposed at a lower side to make a pair with the rear upper reinforcing member.

5. The structure of claim 4, wherein the front upper reinforcing member is installed to and supported by the crash box through a front mounting bracket, and the front lower reinforcing member is installed to and supported by the crash box through a front lower mounting bracket.

6. The structure of claim 5, further comprising a front upper mounting bracket which includes:
    an upper surface which is in contact with an upper surface of the crash box in the height direction of the vehicle and fixedly welded along one edge thereof; and
    an outer side surface which is vertically bent from the upper surface and in contact with an outer side surface of the crash box in the width direction of the vehicle, wherein at the outer side surface, an assembling hole having a circular arc shape is formed, and an end of the front upper reinforcing member is inserted and supported in the assembling hole, and wherein the front lower mounting bracket includes:

a lower surface which is in contact with a lower surface of the crash box in the height direction of the vehicle and fixedly welded along an edge thereof; and an outer side surface which is vertically bent from the lower surface and is in contact with an outer side surface of the crash box in the width direction of the vehicle, wherein at the outer side surface, an assembling hole having a circular arc shape is formed, and an end of the front lower reinforcing member is inserted and supported in the assembling hole.

7. The structure of claim 4, wherein the rear upper reinforcing member and the rear lower reinforcing member are fixedly installed at the front side member through a rear mounting bracket.

8. The structure of claim 7, wherein the rear mounting bracket is formed in a quadrangular plate shape and fixedly welded at the outer side surface of the front side member in the width direction of the vehicle along the edge thereof, at the rear mounting bracket, two assembling bosses are formed to obliquely project forwards in the longitudinal direction of the vehicle, and at each of the two assembling bosses, an assembling hole is formed, and an end of each of the rear upper reinforcing member and the rear lower reinforcing member is fixedly inserted in each assembling hole.

9. The structure of claim 4, wherein a first engaging flange is provided at each of the front upper reinforcing member and the front lower reinforcing member, and a second engaging flange is provided at each of the rear upper reinforcing member and the rear lower reinforcing member, the front upper reinforcing member and the rear upper reinforcing member are engaged to each other by corresponding first and second engaging flanges, and the front lower reinforcing member and the rear lower reinforcing member are engaged to each other by corresponding first and second engaging flanges.

10. A vehicle body reinforcing structure for coping with a small overlap collision, comprising:

front side members which are extended in a longitudinal direction of a vehicle and disposed at left and right sides in a width direction of the vehicle;

a crash box which is installed to a front end of the front side member in the longitudinal direction of the vehicle and absorbs and reduces impact when receiving the impact to be deformed;

a bumper beam which is disposed in front of the crash box in the longitudinal direction of the vehicle, coupled to the crash box, and extended in the width direction of the vehicle; and a reinforcing member which is coupled to both the crash box and the front side member, and protrudes outside of the bumper beam in the width direction of the vehicle to transfer an impact energy to the front side member, wherein the reinforcing member includes:

a front reinforcing member which is supported by the crash box; and a rear reinforcing member which is installed at the front side member and connected to the front reinforcing member, and wherein the front reinforcing member includes:

a front upper reinforcing member which is disposed at an upper side in a height direction of the vehicle; and a front lower reinforcing member which is disposed at a lower side to make a pair with the front upper reinforcing member, and the rear reinforcing member includes:

a rear upper reinforcing member which is disposed at an upper side in the height direction of the vehicle; and a rear lower reinforcing member which is disposed at a lower side to make a pair with the rear upper reinforcing member.

11. The structure of claim 10, wherein the front reinforcing member is extended outwards in the width direction of the vehicle, and the rear reinforcing member is installed obliquely forward in the longitudinal direction of the vehicle.

12. The structure of claim 10, wherein the front reinforcing member and the rear reinforcing member are connected to each other at an acute angle.

13. The structure of claim 10, wherein the front reinforcing member and the rear reinforcing member each have a pipe shape.

14. The structure of claim 10, wherein the front upper reinforcing member is installed to and supported by the crash box through a front mounting bracket, and the front lower reinforcing member is installed to and supported by the crash box through a front lower mounting bracket.

15. The structure of claim 14, further comprising a front upper mounting bracket which includes:

an upper surface which is in contact with an upper surface of the crash box in the height direction of the vehicle and fixedly welded along one edge thereof; and an outer side surface which is vertically bent from the upper surface and in contact with an outer side surface of the crash box in the width direction of the vehicle, wherein at the outer side surface, an assembling hole having a circular arc shape is formed, and an end of the front upper reinforcing member is inserted and supported in the assembling hole, and wherein the front lower mounting bracket includes:

a lower surface which is in contact with a lower surface of the crash box in the height direction of the vehicle and fixedly welded along an edge thereof; and an outer side surface which is vertically bent from the lower surface and is in contact with an outer side surface of the crash box in the width direction of the vehicle, wherein at the outer side surface, an assembling hole having a circular arc shape is formed, and an end of the front lower reinforcing member is inserted and supported in the assembling hole.

16. The structure of claim 10, wherein the rear upper reinforcing member and the rear lower reinforcing member are fixedly installed at the front side member through a rear mounting bracket.

17. The structure of claim 16, wherein the rear mounting bracket is formed in a quadrangular plate shape and fixedly welded at the outer side surface of the front side member in the width direction of the vehicle along the edge thereof, at the rear mounting bracket, two assembling bosses are formed to obliquely project forwards in the longitudinal direction of the vehicle, and at each of the two assembling bosses, an assembling hole is formed, and an end of each of the rear upper reinforcing member and the rear lower reinforcing member is fixedly inserted in each assembling hole.

18. The structure of claim 10, wherein a first engaging flange is provided at each of the front upper reinforcing member and the front lower reinforcing member, and a second engaging flange is provided at each of the rear upper reinforcing member and the rear lower reinforcing member, the front upper reinforcing member and the rear upper reinforcing member are engaged to each other by corresponding first and second engaging flanges, and the front lower reinforcing member and the rear lower reinforcing member are engaged to each other by corresponding first and second engaging flanges.

* * * * *